(12) United States Patent
Lary et al.

(10) Patent No.: US 8,335,966 B1
(45) Date of Patent: Dec. 18, 2012

(54) DUAL PARITY RAID WHEREIN NO MORE THAN N+1 DATA SYMBOLS CONTRIBUTE TO ANY PARITY SYMBOL

(75) Inventors: Richard F. Lary, Colorado Springs, CO (US); Damon Hsu-Hung, Providence, RI (US)

(73) Assignee: Dell Products L.P., Round Rock, TX (US)

( * ) Notice: Subject to any disclaimer, the term of this patent is extended or adjusted under 35 U.S.C. 154(b) by 518 days.

(21) Appl. No.: 12/534,533

(22) Filed: Aug. 3, 2009

Related U.S. Application Data

(63) Continuation of application No. 12/533,153, filed on Jul. 31, 2009, now abandoned.

(60) Provisional application No. 61/137,654, filed on Aug. 1, 2008.

(51) Int. Cl.
*G06F 11/00* (2006.01)

(52) U.S. Cl. ........................................ 714/770; 714/6.24

(58) Field of Classification Search .................. None
See application file for complete search history.

(56) References Cited

U.S. PATENT DOCUMENTS

| | | | | | |
|---|---|---|---|---|---|
| 5,271,012 | A | * | 12/1993 | Blaum et al. | 714/6.24 |
| 6,138,125 | A | * | 10/2000 | DeMoss | 707/999.202 |
| 7,577,866 | B1 | * | 8/2009 | Fan et al. | 714/6.24 |
| 2003/0126523 | A1 | * | 7/2003 | Corbett et al. | 714/718 |
| 2005/0050384 | A1 | * | 3/2005 | Horn | 714/6 |
| 2005/0114727 | A1 | * | 5/2005 | Corbett et al. | 714/6 |
| 2005/0166083 | A1 | * | 7/2005 | Frey et al. | 714/6 |
| 2005/0283652 | A1 | * | 12/2005 | Chen | 714/6 |
| 2006/0005075 | A1 | * | 1/2006 | Chen | 714/6 |
| 2006/0129760 | A1 | * | 6/2006 | Subbarao | 711/114 |
| 2006/0179345 | A1 | * | 8/2006 | Subbarao | 714/6 |
| 2008/0016435 | A1 | * | 1/2008 | Goel | 714/801 |

OTHER PUBLICATIONS

Plank, J., "A New MDS Erasure Code for RAID-6", Technical Report UT-CS-07-602; 13 pages, Sep. 25, 2007.

* cited by examiner

*Primary Examiner* — Gabriel Chu
(74) *Attorney, Agent, or Firm* — Hamilton, Brook, Smith & Reynolds, P.C.

(57) ABSTRACT

An efficient RAID-6 double parity erasure code scheme. Efficiency is provided by the addition of a single term to a diagonal parity equation. For example, in a five-wide layout (having five physical storage devices) the RAID-6 "parity diagonals" end up with six terms, which are the actual diagonal plus one more data block. As a result, no one data symbol contributes to the erasure code determined from the data symbols, such that no more than n+1 data symbols contribute to any one parity symbol.

19 Claims, 7 Drawing Sheets

DUAL PARITY RAID WHEREIN NO MORE THAN N+1 DATA SYMBOLS CONTRIBUTE TO ANY PARITY SYMBOL

RELATED APPLICATION

This application is a continuation of U.S. application Ser. No. 12/533,153, filed Jul. 31, 2009, now abandoned which claims the benefit of U.S. Provisional Application No. 61/137,654, filed on Aug. 1, 2008. The entire teachings of the above application(s) are incorporated herein by reference.

BACKGROUND

1. Review of RAID

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Redundant Array of Independent Disks (RAID) is a taxonomy of redundant disk storage schemes which defines a number of ways for configuring and using multiple computer disk drives to achieve varying levels of availability, performance, capacity, and cost while appearing to the software application as a single large capacity drive. Various RAID levels have been defined from RAID 0 to RAID 6, each offering tradeoffs between these attributes.

RAID 0 is nothing more than traditional striping in that user data is broken into chunks which are stored onto the stripe set by being spread across multiple disks with no data redundancy. RAID 1 is equivalent to conventional "shadowing" or "mirroring" techniques and is the simplest method of achieving data redundancy by having, for each disk, another containing the same data and writing to both disks simultaneously. Combinations of RAID 0 and RAID 1 are referred to as "shadowing striped sets" (RAID 0+1) or "striping shadow sets (RAID 1+0 or RAID 10)—either one resulting in the relative performance advantages of both RAID levels.

RAID 2, which utilizes a Hamming Code written across the members of the RAID set is not now considered to be of significant importance.

In RAID 3, data is striped across a set of disks with the addition of a separate dedicated drive to hold parity data. The parity data is calculated dynamically as user data is written to the other disks to allow reconstruction of the original user data if a drive fails without requiring replication of the data bit-for-bit. Error detection and correction codes ("ECC") such as exclusive OR ("XOR") or more sophisticated Reed-Solomon techniques may be used to perform the necessary mathematical calculations on the binary data to produce the parity information in RAID 3 and higher level implementations. While parity allows the reconstruction of the user data in the event of a drive failure, the speed of such reconstruction is a function of system workload and the particular algorithm used.

As with RAID 3, the scheme known as RAID 4 consists of N data disks and one parity disk wherein the parity disk sectors contain the bitwise XOR of the corresponding sectors on each data disk. This allows the contents of the data in the RAID set to survive the failure of any one disk. RAID 5 is a modification of RAID 4 which stripes or "rotates" the parity across all of the disks in the array in order to statistically equalize the load on the disks. In certain RAID 4 and RAID 5 implementations, insufficient data is received to enable parity to be calculated solely from the incoming data, as is the case with RAID 3. As one example, in the case of a RAID 5 "partial stripe" write, the array controller or RAID software must combine new data with old data and existing parity data to produce the new parity data, requiring each RAID write to include a read from two drives (old data, old parity), the calculation of the difference between the new and old data, the application of that difference to the old parity to obtain the new parity, and the writing of the new data and parity back onto the same two drives. The situation is somewhat simplified in the case of a so-called "full-stripe" write, in that only the new data is needed, but the calculation of new parity must still be performed.

The designation of RAID 6 has been used colloquially to describe RAID schemes that can withstand the failure of two disks without losing data through the use of two parity drives (commonly referred to as the "p" and "q" drives) for redundancy and sophisticated Error Correction Coding (ECC) techniques. Data and ECC information are striped across all members of the RAID set. Write performance is generally worse than with RAID 5 because three separate drives must each be accessed twice during writes.

RAID-6 has become used a generic term for any of a number of schemes that provide double fault tolerance the failure of up to two data volumes. Unlike other RAID types (e.g., RAID-5), RAID-6 therefore does not necessarily refer to a single, standardized algorithm. RAID-6 is also referred to as "dual parity" or "double parity" data protection. Traditionally, RAID-6 p parity blocks are identical to the parity blocks used in RAID-3 or RAID-5. The other (q) parity blocks are generally calculated using either Galois Field arithmetic or by performing an XOR operation across a different set of data blocks from those used to compute the p parity block.

Double parity schemes used with RAID-6 that do not involve Galois Field arithmetic (henceforth called "dual parity" schemes) all involve a matrix of n×n data blocks plus a vector of n parity blocks, "p", and another vector of n parity blocks, "q". "p" is the conventional RAID-5 parity (horizontal across n data blocks). Ideally, each data block contributes to a single p and a single or two parity blocks in total. This implies a measure of efficiency that can be called the "contribution ratio"—this ratio being 2 for the ideal case. But the ideal case requires a very specific layout of parity and data blocks across the disks, which is unlikely to be appropriate given other goals such as performance. More general layouts are possible but only by increasing the contribution ratio—the q expressions end up having more than n terms in them, or they incorporate p parity blocks as well as data blocks.

An example of a RAID-6 scheme that does not use Galois Field arithmetic is "RAID-DP". In this "diagonal parity" method, data is organized as an n×n matrix of data chunks.

The columns of the matrix correspond to data volumes, but the rows are arbitrary—they correspond to "chunks" of data, which could be a single bit or an entire stripe, as long as it is uniform.

There are two sets of parity blocks for the matrix, p and q parity, on two parity drives. (Of course in the real world the parity is "rotated" to spread the load, but that complication is ignored here.) Both the p and q parity are computed with simple XOR operations over sets of blocks. The equations for p parity are simple:

$$\sum_{j=0}^{n-1} d_{i,j} = p_i \text{ for } 0 \le i < n$$

Standard RAID-5 parity equations (A note on notation. $d_{i,j}$ is the $i^{th}$ data chunk on data disk j of the RAID set, $p_i$ and $q_i$ are the $i^{th}$ chunks of P and Q parity. The "+" symbol is used to represent chunk XOR operations in the context of data, and ordinary addition in the context of indices and other bookkeeping variables. This should not cause confusion since the context is clear. Also, the "*" symbol will be used to represent the "multiplication" of a chunk of data by a binary "selector"—i.e. B*$p_1$ is equal to "if B then $p_1$ else 0"—in addition to the ordinary multiplication operation on indices, etc.)

The equations for q parity are a little more complex:

$$\left(\sum_{j=0}^{n-i-2} d_{j,i+1+j}\right) + p_{n-1-i} + \sum_{j=n-i}^{n-1} d_{j,i+j-n} = q_i \text{ for } 0 \le i \le n$$

Diagonal parity equations

For example, if n=5, the $q_i$ are calculated thusly:

$d_{0,1}+d_{1,2}+d_{2,3}+d_{3,4}+p_4=q_0$ $d_{0,2}+d_{1,3}+d_{2,4}+p_3+d_{4,0}=q_1$ $d_{0,3}+d_{1,4}+p_2+d_{3,0}+d_{4,1}=q_2$ $d_{0,4}+p_1+d_{2,0}+d_{3,1}+d_{4,2}=q_3$ $p_0+d_{1,0}+d_{2,1}+d_{3,2}+d_{4,3}=q_4$

This is graphically depicted in FIG. 2. It is easy to see from that diagram that p parity is "row" parity, and q parity is "diagonal" parity for those diagonals that include the p parity column (i.e. all diagonals but the "data only diagonal"). The q parity diagonals thus "wrap around" from the last to the first column as necessary.

2. Limitations of Certain Approaches

When trying to recover from, say the failure of two data volumes, one must solve a set of 2n simultaneous equations (the p and q parity equations) in 2n unknowns (n missing data chunks from each of the two failed volumes). For instance, if the drives representing the leftmost two columns of these equations failed, the ten equations that would have to be solved for the ten variables $\{d_{i,0}, d_{i,1}; 0 \le i \le 4\}$ would include: $d_{1,0}+d_{1,1}=(p_1+d_{1,2}+d_{1,3}+d_{1,4})$ Row parity equation for $p_1$ with known terms removed $d_{1,0}+d_{2,1}(q_4+p_0+d_{3,2}+d_{4,3})$ Diag parity equation for $q_4$ with known terms removed The right-side of these equations are sometimes referred to as the "syndromes" of the particular error encountered, and of course are dependent on the actual data on the disks as well as the selection of which drives have failed. The left-side of these equations is dependent only on the total number of data drives and the selection of which drives have failed. As with ordinary simultaneous equations, the values of the syndromes do not affect the solvability of the system of equations; only the structure of the left-side determines this.

In the case of RAID-DP, it can be shown that each of the n (n−1)/2 systems of 2n simultaneous equations, resulting from the n (n−1)/2 combinations of two of the n data drives failing, is always solvable if n+1 is a prime number. When one or both of the failed drives is a parity drive, the systems of equations are much more straightforward and can also all be solved.

Every chunk of data in these methods contributes to one p parity chunk and at least one q parity chunk. Some contributions to q parity chunks are direct, and some are indirect through the p parity chunk that covers the data chunk and itself contributes to a q parity chunk. For instance, $d_{1,2}$ contributes to $p_1$ and to $q_0$ and (via $p_1$) to $q_3$. In fact, in the above example all data chunks but the "data-only diagonal" chunks contribute to two q parity chunks, and all data chunks contribute to a p parity chunk, so the "average" data chunk contributes to 2.8 parity chunks—that number, which we will call the Contribution Ratio, asymptotically approaches 3 for large RAID-DP arrays. This means that a change to a single data chunk will usually result in the re-computation of 3 parity chunks. Since writing (or reading-modifying-writing) three parity blocks for every single-block data write (using the standard RAID "sub-stripe write" algorithm) is unacceptably high overhead, these RAID 6 implementations use a chunk size that is no larger than ((sector size)/n), so that an entire column of data chunks fits into a single disk sector and contributes to corresponding single p and q disk sectors.

In another RAID 6 method from Adaptec, each data chunk contributes to exactly two parity chunks—this is the theoretical minimum Contribution Ratio, because if any data chunk contributed to only a single parity chunk then the failure of that data volume and parity volume would leave the data unrecoverable. However, Adaptec's method requires the intermixing of parity and data on every data volume in a very specific way, as it depends on the fact that the loss of any volume will result in the loss of some data chunks and some parity chunks. As a result of this intermixing, Adaptec's RAID 6 encourages the use of a large chunk, on the order of 64-1024 disk sectors, to avoid having read requests span multiple data chunks and incurring extra disk head motion; however, the entire data+parity matrix must be present for dual-failure correction, which requires the use of n*(n+2)* (chunk size) bytes of controller memory; for instance, if n=8 and the chunk size is 512 sectors (256 KB), then 20 MB of controller memory is required for a dual-failure recovery. The Adaptec RAID 6 also makes it harder to optimize sequential small writes into an efficient "RAID 3 style" write because of the large chunk size and the large number of chunks in a complete RAID 6 redundancy group.

One might think there are other XOR-only RAID-6 algorithms, as the number of sets of parity equations for n data disks in a RAID 6 configuration as described above, even assuming that p parity is identical to RAID 5 parity, is huge—on the order of $2^{n^3}$. Applying some simplifying assumptions about the number of data chunks contributing to each q parity chunk reduces the number of sets of equations to $n^{2n+3}$, still huge. So the problem is finding one. The simplest diagonal parity scheme, with the smallest Contribution Ratio (2.0), is:

$$\sum_{j=0}^{n-1} d_{i,j} = p_i \text{ for } 0 \leq i < n$$

$$\sum_{j=0}^{n-1} d_{j,(i+j) \bmod n} = q_i \text{ for } 0 \leq i < n$$

This is graphically depicted in FIG. 3. It is a very straightforward set of equations, but unfortunately it fails as a data protection technique. As stated before, when trying to recover from the failure of two data volumes we must solve a set of 2n simultaneous equations (the p and q parity equations) in 2n unknowns (the n missing data chunks from each of the two failed volumes). For the simple diagonal parity above, none of the n(n−1)/2 combinations of two failed data volumes results in a solvable set of simultaneous equations.

SUMMARY OF THE INVENTION

In a preferred embodiment, an information handling system provides a RAID-6 level storage subsystem with a dual parity scheme that allows for recovery from a failure or erasure of up to two of the available data arrays. In one embodiment, the erasure code includes two additional arrays of n parity symbols, formed from logical combinations of corresponding data symbols, such that no more than n+1 data symbols contribute to any parity symbol.

In a particular embodiment having a prime number, n, of storage devices, each q parity equation consists of the XOR of n diagonal data terms plus at most one extra term determined by the positions of a Knight's Tour of the n×n matrix of data blocks.

If the p disks survive then the method computes P syndromes. If the q disks survive it then computes Q syndromes. In a next step, the failure is classified as follows: if the p and q disks both fail, then they are reconstructed from the parity equations. If the q disk and a data disk k fail, then the data is reconstructed for disk k according to a formula using the P syndrome. If the p disk and a data disk k fail, then the data for disk k is reconstructed from a second formula using the Q syndrome.

If both data disks j and k have failed, then a matrix of constant bitmaps, whose bits are represented as $B_{n,D,i}$ is used, that was derived based on the number of devices n and a difference D in column numbers (modulo n) corresponding to the two failed devices, j and k.

In instances where the number of data disks, n, is not equal to a prime number, one approach is to apply the method for a number of disks equal to the next higher prime. For example, if there are 8 data disks available, one calculates the Knight's Tour correction for n=11 (the next highest prime number) and then just assume that disks 9, and 11 never fail and always contain zeros.

In other implementations, a combination of two Knight's Tour solutions can be commensurate with providing a solution for a number of disks equal to a power of 2. Indeed, because of the mathematical principle that every even number is the sum of two primes (Goldbach's Conjecture), this method allows in general an n×n matrix code, with n prime, to be commensurate with storage systems that expect data chunks equal in size to a power of 2.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the invention.

DETAILED DESCRIPTION OF A PREFERRED EMBODIMENT

A description of example embodiments of the invention follows.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more data storage devices (that may for example be disk drives), one or more network ports for communicating with external devices as well as various input and output (I/O) devices, such as a keyboard, a mouse, and a video display. The information handling system may also include one or more buses operable to transmit communications between the various hardware components.

The present invention relates to an information handling system that provides a RAID-6 level storage subsystem with a dual parity scheme. The RAID storage subsystem can be implemented in either hardware or software. In the former instance, the RAID algorithms can be packaged into separate disk controller hardware coupled as one or more of the input/output (I/O) devices and, although adding little or no central processing unit (CPU) overhead, the additional hardware required nevertheless adds to the overall system cost. On the other hand, software implementations can incorporate the RAID algorithms into system software executed by the main processor together with the operating system, obviating the need and cost of a separate hardware controller, yet adding to CPU overhead.

Figure 1A:
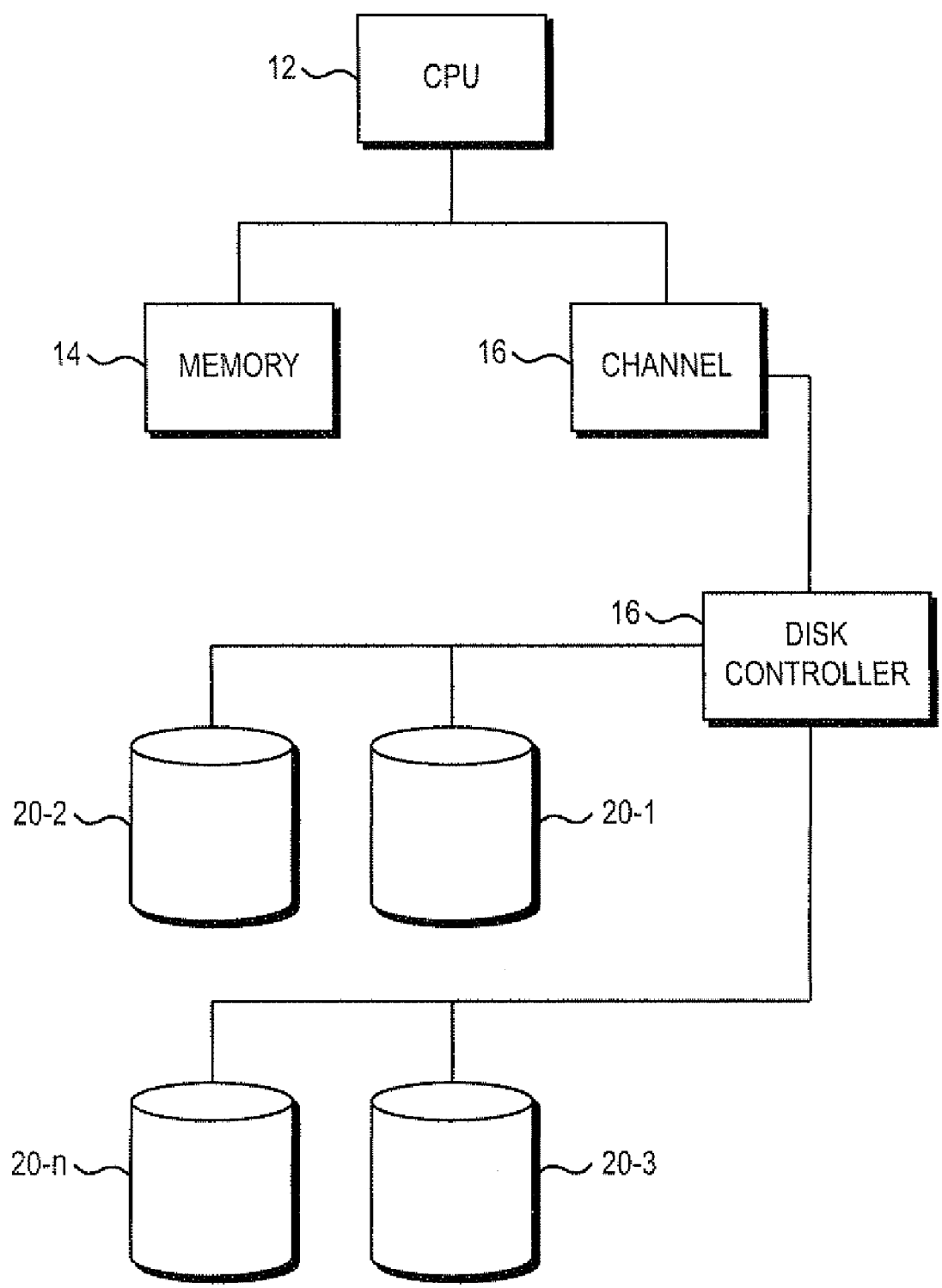
FIG. 1A is a high level diagram of a data processing system in which the RAID-6 algorithm is implemented in dedicated disk controller hardware.

FIG. 1A is an example of the first case, where a hardware disk controller is used to implement the RAID-6 double parity scheme described below. This information handling system includes a Central Processing Unit (CPU) 12, memory 14, and a hardware disk controller 18 that couples to the CPU via input/output channel 16. A number of physical storage devices, here embodied as disk drives 20-1, 20-2, . . . , 20-*n* provide a storage array that will be protected against failure. This arrangement may be typical of a high-performance file server or main frame computer.

Figure 1B:
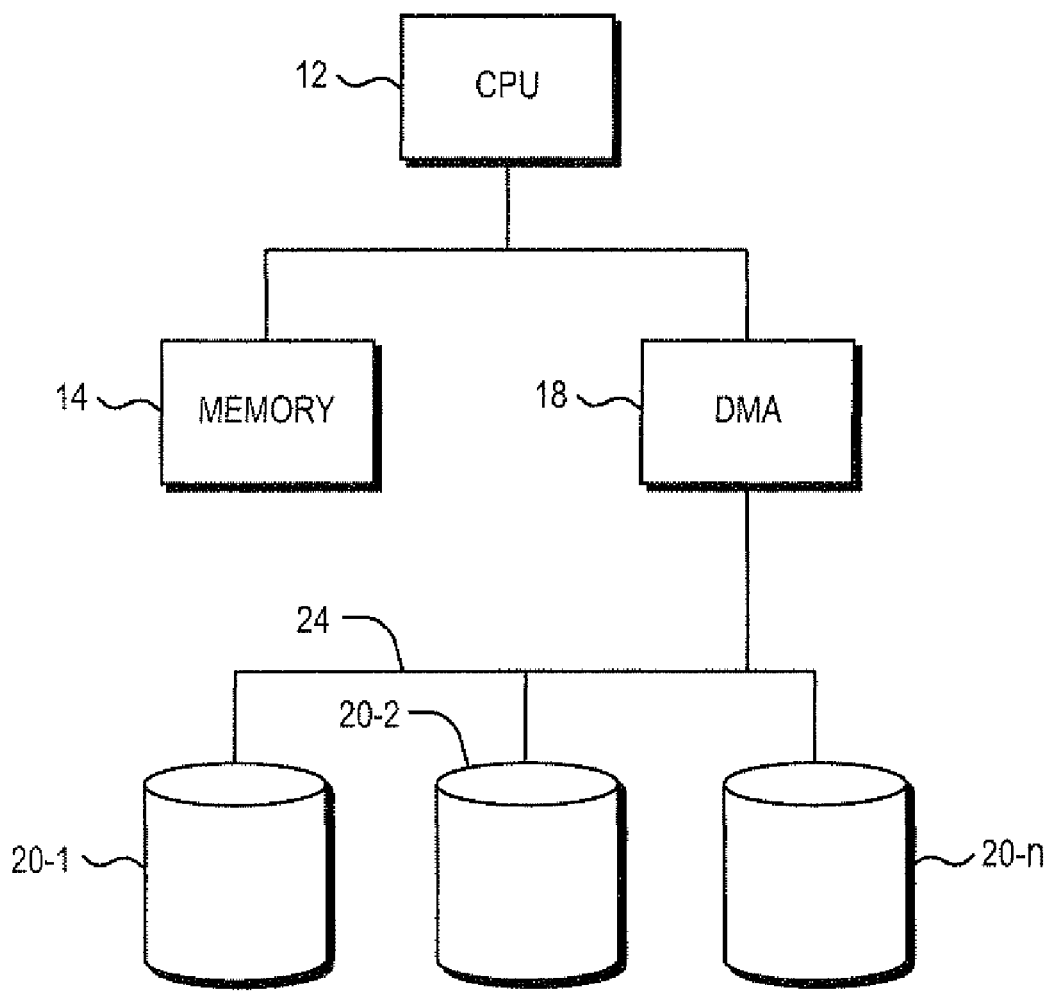
FIG. 1B is an alternate embodiment showing where the RAID-6 algorithm is implemented in a CPU itself.
Figure 2:
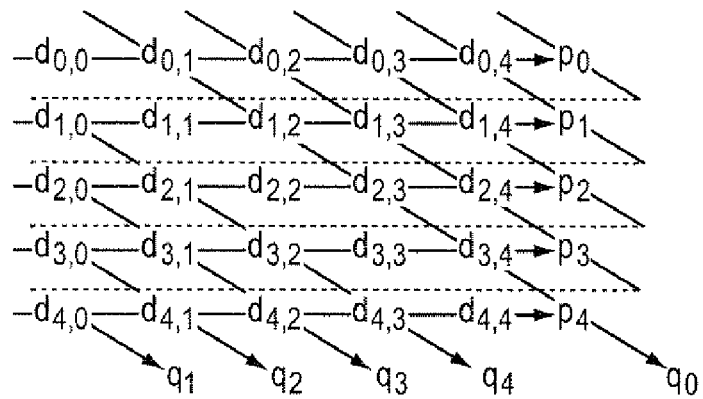
FIG. 2 is a graphical depiction of a prior art RAID-6 parity scheme.

FIG. 1B is an example of the second case, where the RAID-6 double parity scheme described below is implemented in system level, e.g., operating system or device driver software executed by the CPU. In this embodiment, disk drives 20-1, 20-2, . . . , 20-*n* are coupled to the CPU 12 via Direct Memory Access (DMA) 18 using a shared peripheral bus 24 such as a Serial ATA interface. This arrangement is more typical of a personal computer.

More specifically, in a preferred embodiment, the RAID-6 process is designed to add some terms to the simplest possible diagonal parity scheme in order to result in solvable simultaneous equations for all combinations of two failed data volumes. One should add at least n−1 terms that cover n−1 distinct data volumes (columns); if one did not, then it would be possible to find two data volumes that were not represented by any of the added terms, and recovery from the failure of those two data volumes would require solving a set of simultaneous equations whose left-side was identical to those of the equivalent failure in simple diagonal parity—which are all unsolvable.

Figure 3:
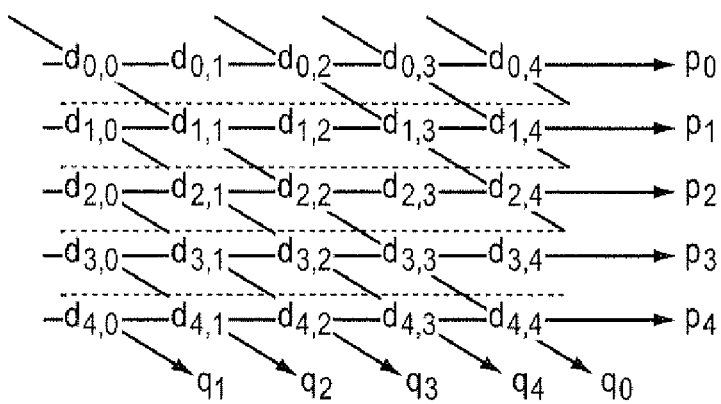
FIG. 3 is a graphical depiction of a "RAID-6" parity scheme that does not work.

After a search of "equation space", it turns out that one set of extra terms that can be added to the simplest diagonal parity equations (e.g., FIG. 3) results from taking a miniature "knight's tour" of the data chunk matrix and adding the squares thus traversed to the q parity equations. The equations describing this method in a preferred embodiment are given by:

$$\sum_{j=0}^{n-1} d_{i,j} = p_i \text{ for } 0 \le i < n$$

$$\left(\sum_{j=0}^{n-1} d_{j,(i+j) \bmod n}\right) + d_{(i+1) \bmod n,(2i+2) \bmod n} = q_i \text{ for } 0 \le i < n$$

Figure 4:
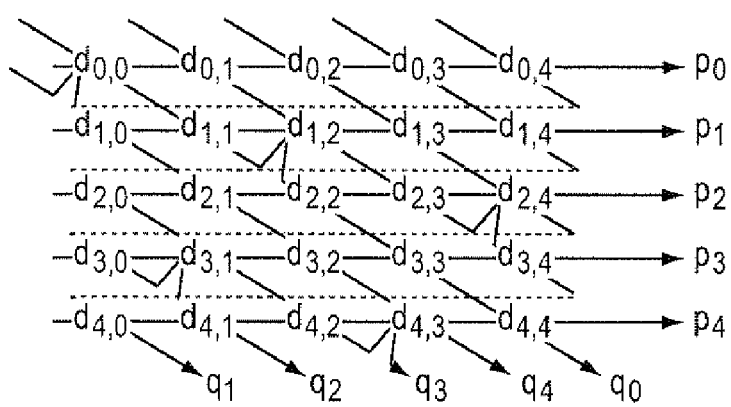
FIG. 4 is a graphical depiction of a "Knights Tour" RAID-6 parity scheme according to a preferred embodiment.
Figure 5:
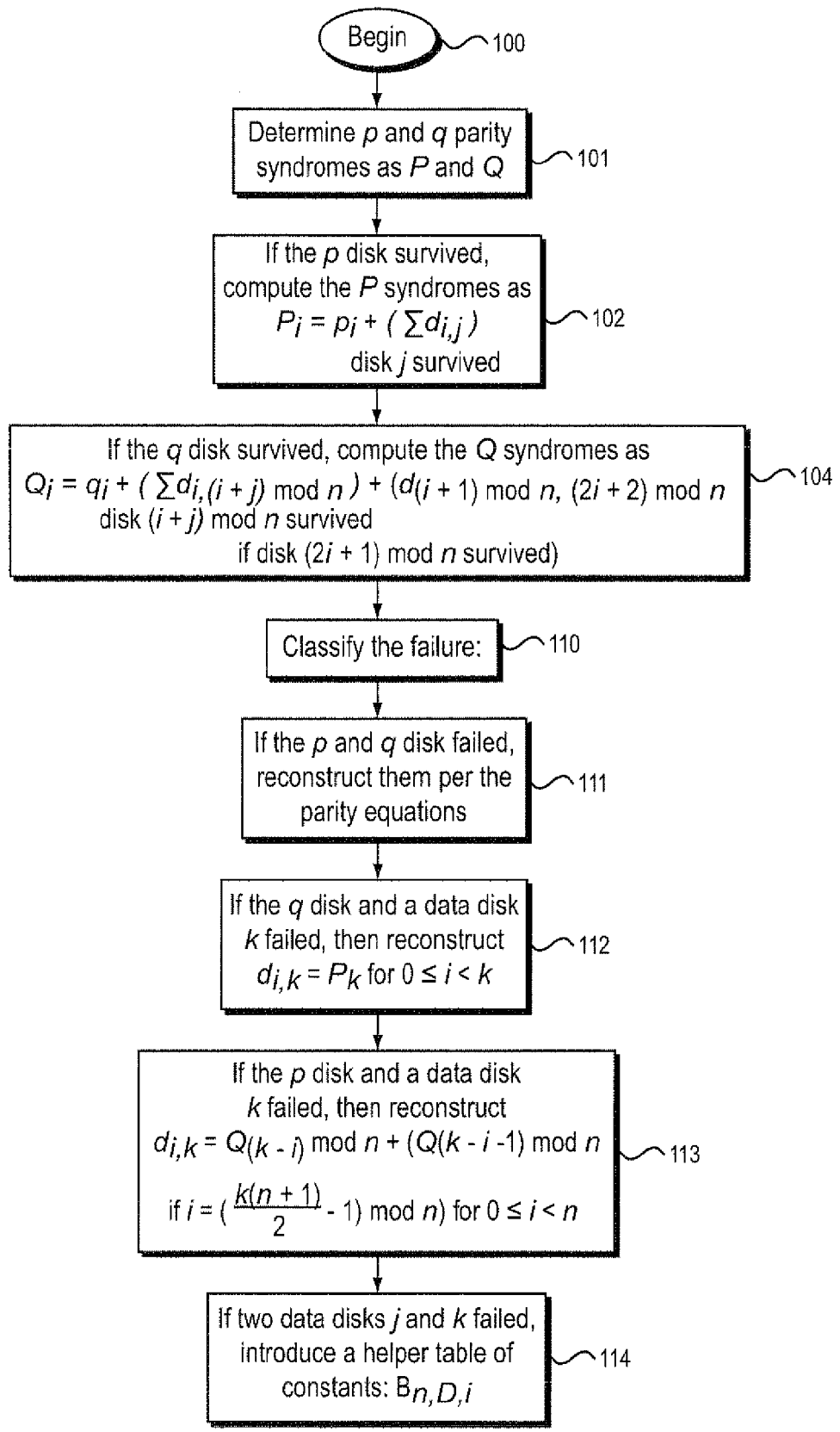
FIG. 5 through FIG. 8 are a set of operations performed to recover from a failure of two storage devices, including a set of operations to determine a table of helper constants that can be compiled.
Figure 6:
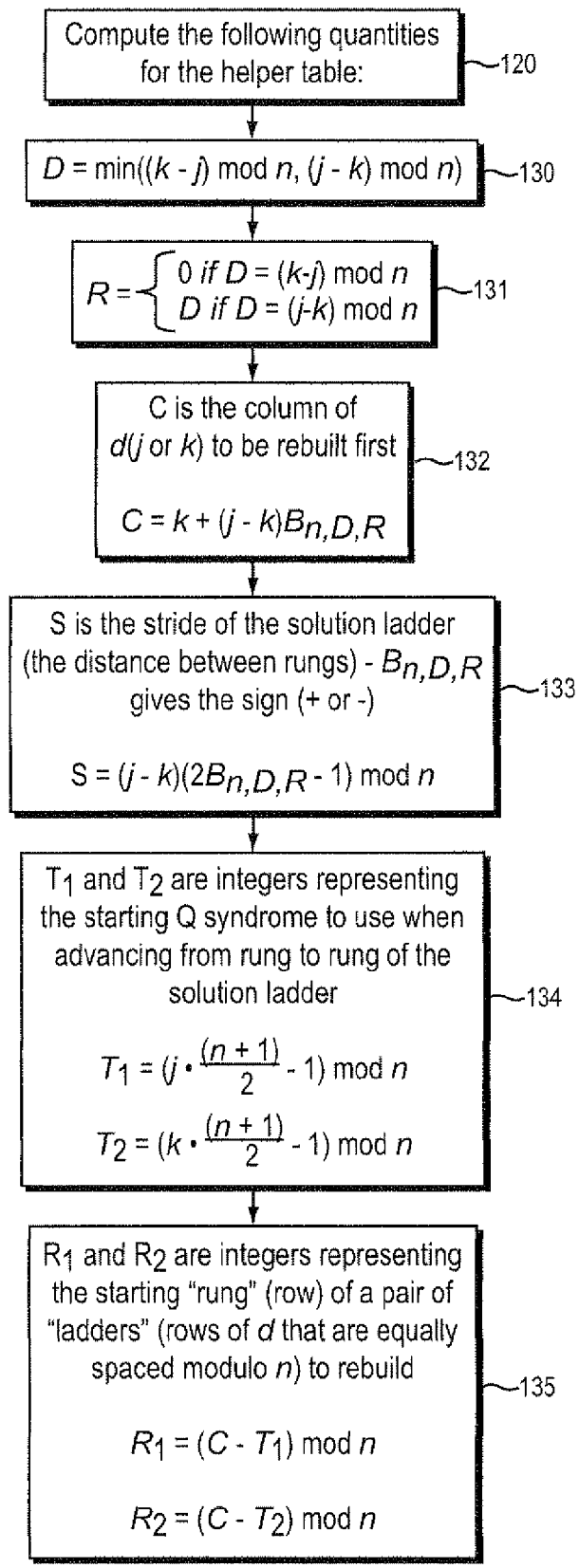

The graphical description of this, shown in FIG. 4, illustrates each q-parity diagonal making a "detour" to incorporate its extra term. The pattern of extra terms thus forms a "Knight's Tour" (e.g., "one down, two right"), starting from $d_{0,0}$ and wrapping horizontally. This is called a "Knight's Tour" herein because the patterns involved look like the moves of a Knight on a chess board. Each q term incorporates exactly one of the extra terms.

is This system of equations is always solvable for the data or parity chunks from two missing volumes if and only if n is a prime number. (This has been verified computationally for all n<500.) The Contribution Ratio of the example of FIG. 4, where n=5 is 2.2 (20 chunks contribute to only one q parity chunk, 5 chunks—the extra terms—contribute to two q parity chunks). As the number of volumes increases, the Contribution Ratio of this scheme goes asymptotically to the ideal value of 2.

This particular set of equations also has the interesting property that if any one extra term is deleted, the resulting set of equations is still always solvable for the data or parity chunks from two missing volumes. This can be used to reduce the Contribution Ratio slightly, in this example to 2.16.

A search has verified that the above Knight's Tour system of parity equations, and its symmetric and permutational equivalents, is believed to be the only system of equations with n or less extra terms on top of simple diagonal parity that can always be solved for the data or parity chunks from two missing volumes. The symmetry equivalents of the Knight's Tour can be expressed by changing the q parity formula to:

$$\left(\left(\sum_{j=0}^{n-1} d_{j,(i+j) \bmod n}\right) + d_{(i+k+l) \bmod n,(2i+2k+l) \bmod n} = q_i \text{ for } 0 \le i \le n,\right)$$

$$\text{for } 0 < k < n, \ 0 \le l \le n$$

This represents two kinds of symmetry: diagonal translation (where the Knight's Tour passes through $d_{1,1}$ instead of $d_{0,0}$; and equation rotation (where the diagonal element on the knight's tour contributes to $q_{n-k}$ instead of $q_{n-1}$). Together these symmetries yield n(n−1) symmetric variants of the Knight's Tour. Renumbering the columns of the data matrix and renumbering the n q-parity equations multiply the number of variants by approximately $(n!-n)^2$ via permutation. Adding the number of variants with any single extra term omitted brings the total number of RAID 6 solutions equivalent to a Knight's Tour for a given n to an approximate value of $(n+1)(n-1)(n!-1)^2$, which is a huge number, although quite small compared to $n^{2n+3}$.

The use of the Knight's Tour RAID 6 equations to reconstruct data after a dual failure depends on which two drives fail. The first step in any solution is to convert the surviving parity terms into "syndromes", which are the constant "right side" of the system of simultaneous equations to be solved.

Denoting p and q parity syndromes as P and Q, respectively, the process and equations for this are shown in FIGS. 5 through 8.

From an initial state 100 (of FIG. 5), a first task in state 101 is to determine the P and Q syndromes. In state 102, if error conditions indicate that the p disk survived in its entirety, compute the P syndromes as $$P_i = p_i + \left(\sum_{\text{disk } j \text{ survived}} d_{i,j}\right)$$

In state 104, if the q disk survived, compute the Q syndromes as $$Q_i = q_i + \left(\sum_{\text{disk}(i+j) \bmod n \text{ survived}} d_{i,(i+j) \bmod n}\right) + (d_{(i+1) \bmod n,(2i+2) \bmod n}$$

if disk $(2i+1) \bmod n$ survived)

Next, in state 110 the failure mode is classified, by determining if the p or q disk failed, or which data disk j and/or k have failed.

In state 111, if the p and q disk failed, just reconstruct them per the parity equations.

In state 112, if the q disk and data disk k failed, then reconstruct d as follows:

$$d_{i,k} = P_k \text{ for } 0 \le i \le k$$

In state 113, if the p disk and data disk k failed, then reconstruct $$d_{i,k} = Q_{(k-i) \bmod n} + \left(Q_{(k-i-1) \bmod n} \text{ if } i = \left(\frac{k(n+1)}{2} - 1\right) \bmod n\right)$$

for $0 \le i \le n$

In state 114, if both data disks j and k have failed the situation is more complicated. Here, one needs to introduce a helper table of constants to drive the solution: $B_{n,D,i}$. This helper table is a matrix of bitmaps (bits indexed by i), based on the number of data drives n and the difference D in the column numbers (modulo n) corresponding to the failed data disks. This distance D is the minimum of (k−j) mod n and (j−k) mod n, (for instance if n=7, j=1, and k=5, then D=3). There are (n−1)/2 n-bit bitmaps for each value of n because of the way D is computed.

Note that this table is simply a way of "parameterizing" the solution for an arbitrary n; for any particular n, this table can be "compiled" in advance into a specific sequence of XOR operations that reconstructs the data for any two failed data drives. However, the recovery method described here is only one possible recovery method. In fact, it is a specific approach to solving the "2n simultaneous equations in 2n unknowns" described above. But various other well-known methods (e.g. Gaussian elimination) for solving simultaneous equations can be used to recover the failed devices in a Knight's Tour layout.

The $B_{n,D,i}$ tables for various n are given as an appendix to this document.

From state 120 (See FIG. 6), using the appropriate $B_{n,D,i}$ table, the next step is to compute the following quantities:

In state 130:
D = min((k − j) mod n, (j − k) mod n)

In state 131:

$$R = \begin{cases} 0 & \text{if } D = (k-j) \bmod n \\ D & \text{if } D = (j-k) \bmod n \end{cases}$$

In state 132:
C = k + (j − k)$B_{n,D,R}$            C is the column of d (j or k) to be rebuilt first In state 133:
S = (j − k)(2$B_{n,D,R}$ − 1) mod n      S is the stride of the solution ladder (the distance between rungs) − $B_{n,D,R}$ gives the sign (+ or −).

In state 134:

$$T_1 = \left(j \cdot \frac{n+1}{2} - 1\right) \bmod n$$

$$T_2 = \left(k \cdot \frac{n+1}{2} - 1\right) \bmod n$$

$T_1$ and $T_2$ are integers representing the starting Q syndrome to use when advancing from rung to rung of the solution ladder.

Figure 7:
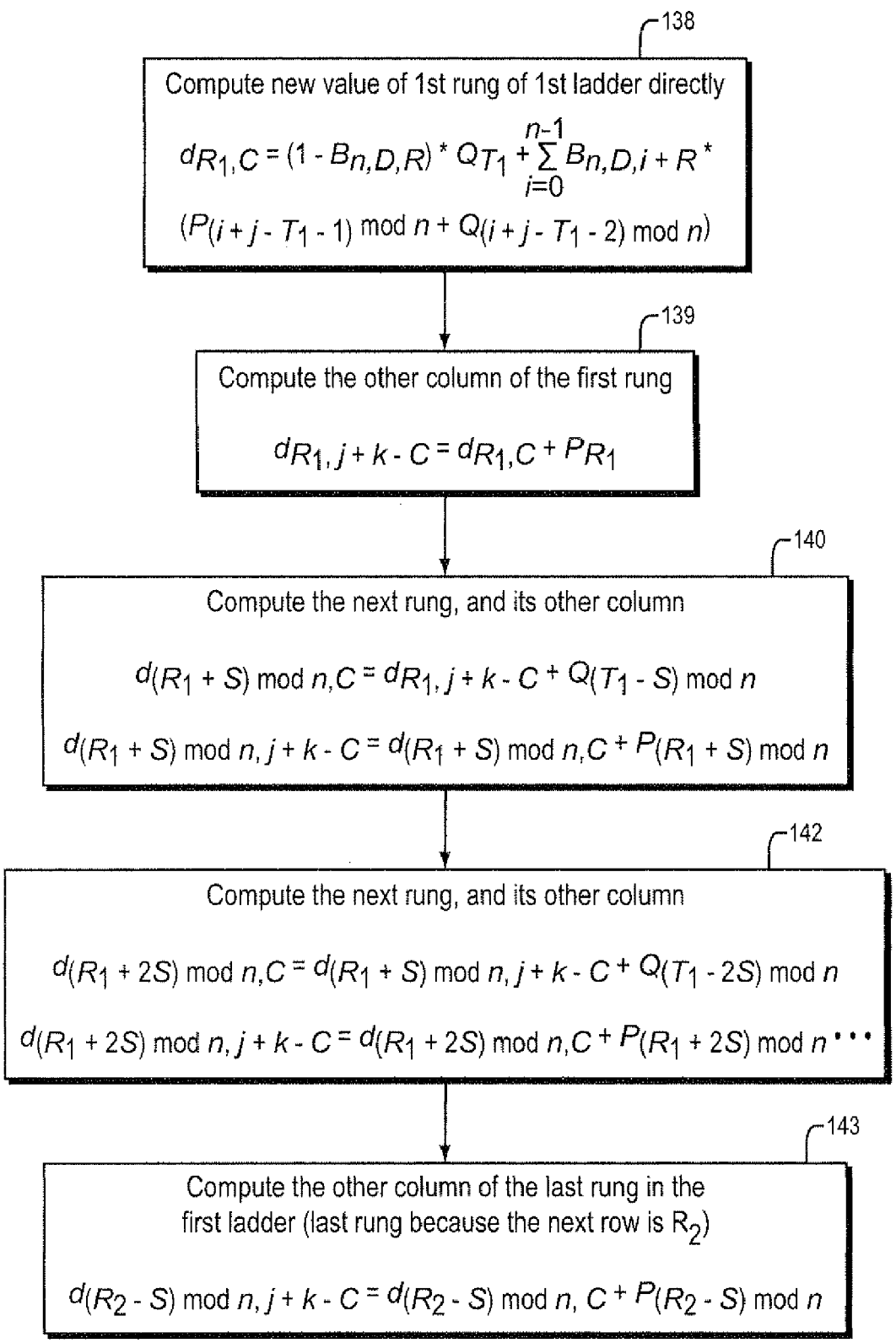
Figure 8:
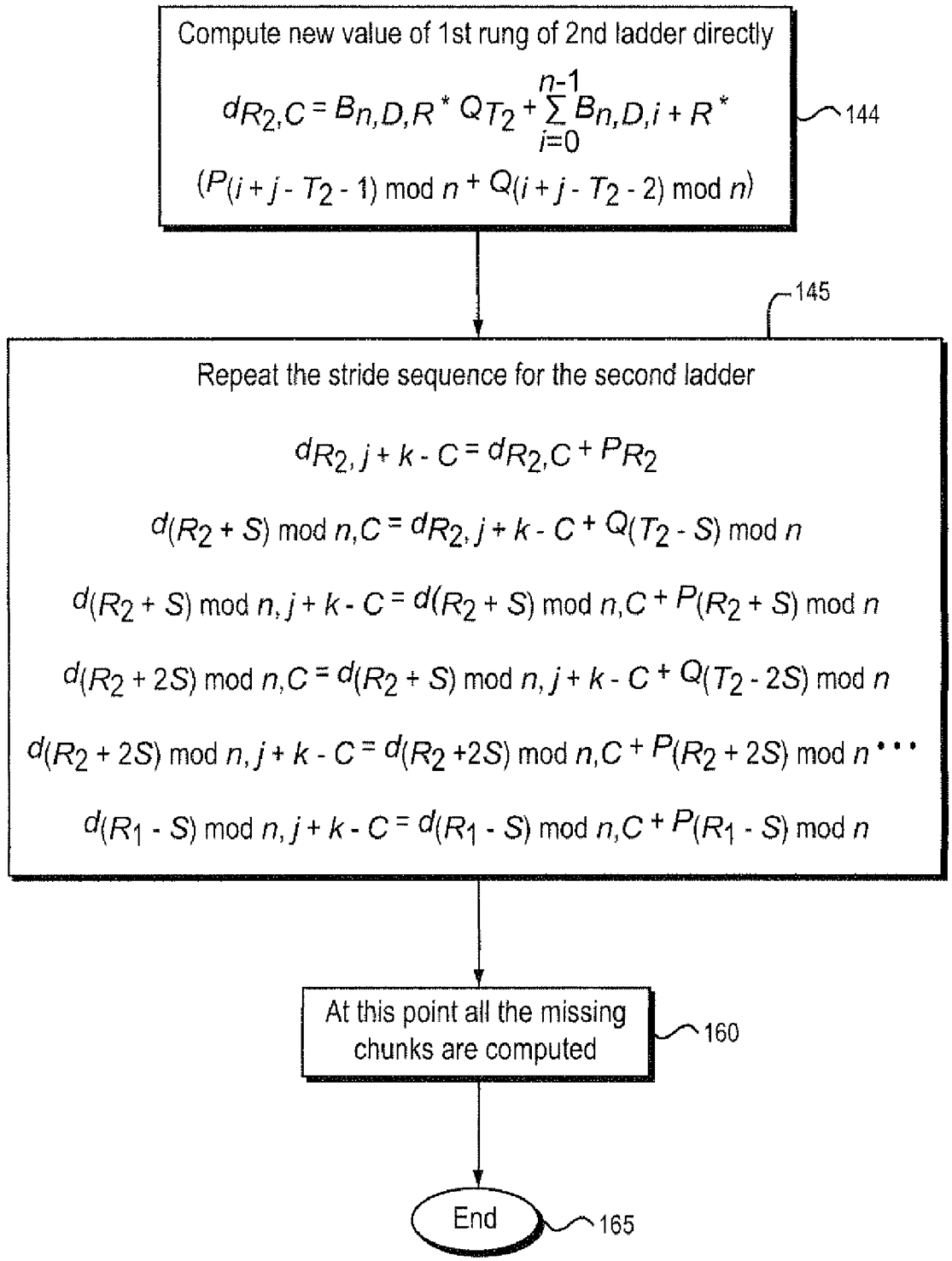

In state 135,
$R_1$ = (C − $T_1$) mod n                 $R_1$ and $R_2$ are integers representing the starting
$R_2$ = (C − $T_2$) mod n                 "rung" (row) of a pair of "ladders" (rows of d that are equally spaced modulo n) to rebuild Turning now to FIG. 7, starting in state 138, $$d_{R_1,C} = (1 - B_{n,D,R}) * Q_{T_1} + \sum_{i=0}^{n-1} B_{n,D,j+R} * \left(P_{(i+j-T_1-1) \bmod n} + Q_{(i+j-T_1-2) \bmod n}\right)$$

Compute new value of 1st rung of 1st ladder directly.

In state 139:
$d_{R_1, j+k-C} = d_{R_1,C} + P_{R_1}$                                  Compute the other column of the first rung In state 140:
$d_{(R_1+S) \bmod n, C} = d_{R_1, j+k-C} + Q_{(T_1-S) \bmod n}$         Compute the next rung, and its other column
$d_{(R_1+S) \bmod n, j+k-C} = d_{(R_1+S) \bmod n, C} + P_{(R_1+S) \bmod n}$ In state 142:
$d_{(R_1+2S) \bmod n, C} = d_{(R_1+S) \bmod n, j+k-C} + Q_{(T_1-2S) \bmod n}$   Compute the next rung, and its other column
$d_{(R_1+2S) \bmod n, j+k-C} = d_{(R_1+2S) \bmod n, C} + P_{(R_1+2S) \bmod n}$
...

In state 143:
$d_{(R_2-S) \bmod n, j+k-C} = d_{(R_2-S) \bmod n, C} + P_{(R_2-S) \bmod n}$    Compute the other column of the last rung in the first ladder (last rung because the next row is $R_2$)

In state 144 (see FIG. 8) the second ladder is computed starting at state 144:

$$d_{R_2,C} = B_{n,D,R} * Q_{T_2} + \sum_{i=0}^{n-1} B_{n,D,j+R} * \left(P_{(i+j-T_2-1) \bmod n} + Q_{(i+j-T_2-2) \bmod n}\right)$$

Compute new value of the 1st rung of the 2d ladder directly.

Next, in state 145:
$d_{R_2, j+k-C} = d_{R_2,C} + P_{R_2}$                                  Repeat the stride sequence for the second ladder
$d_{(R_2+S) \bmod n, C} = d_{R_2, j+k-C} + Q_{(T_2-S) \bmod n}$
$d_{(R_2+S) \bmod n, j+k-C} = d_{(R_2+S) \bmod n, C} + P_{(R_2+S) \bmod n}$
$d_{(R_2+2S) \bmod n, C} = d_{(R_2+S) \bmod n, j+k-C} + Q_{(T_2-2S) \bmod n}$ -continued $d_{(R_2+2S)mod\ n, j+k-C} = d_{(R_2+2S)mod\ n, C} + P_{(R_2+2S)mod\ n}$

...

$d_{(R_1-S)mod\ n, j+k-C} = d_{(R_1-S)mod\ n, C} + P_{(R_1-S)mod\ n}$

In state 160, all missing chunks will have been computed.

---

This might appear to result in a complicated solution, but it in reality reduces to a set of bitmap rotations, and modular arithmetic, mostly additions or subtractions. The few multiplications are by (n+1)/2 or (n−1)/2 modulo n and can be done with "tricks"—e.g. observing that (x·(n+1)/2)mod n=x/2 if x is even and (x+n)/2 if x is odd. By comparison, there are an average of (n−½) XORs per missing chunk, compared to, e.g., (n−2) XORs per chunk for certain other prior art schemes.

If the algorithm is implemented for a specific n as opposed to the general algorithm, then the above steps can be "compiled" with the $B_{n,D,i}$ into a specific sequence of XOR operations for each failed pair of data disks. Then it is a simple matter to index to the right sequence (based on which disks failed) and execute it—very fast, indeed.

The Knights Tour RAID-6 scheme produces full double fault tolerance. At least one innovation is the addition of a single term to each diagonal parity equation. For example, in a five-wide layout (five data disks) the "diagonals" end up with six terms, which are the actual diagonal plus one more data block. So for that example the Contribution Ratio is 2.2. In fact, the minimum number of additional parity terms needed for a general solution is n−1 (so in the example the 5-wide layout requires four additional terms, for a Contribution Ratio of 2.16).

It should now be understood that, although not as efficient, it is also possible to use more than the minimum number of extra terms.

What if there are not a Prime Number of Physical Storage Devices Available?

The Knight's Tour equations can be extended to apply to non-prime numbers of storage devices in the same way that other algorithms can be extended to apply to numbers of storage devices that are not one less than a prime.

For instance, if there are 8 physical storage devices, one would use the Knight's Tour for n=11 (the next higher prime number) and just assume that storage devices 9, 10, and 11 never fail and always contain all zeros. These are commonly referred to as "phantom" storage devices or "phantom" columns.

There is a special case solution (actually many solutions) for n=4, where the n extra terms for the q parity equations do not form a Knight's tour pattern. This document does not detail these solutions, as the equation search space for n=4 is small enough that they are easily found.

Practical Considerations for Disk RAID 6—Prime Numbers and Powers of 2

A serious issue with any of the "diagonal parity" RAID 6 schemes is that the size of the matrix, n, controls the number of rows as well as the number of columns (drives). In fact, as seen above, it primarily controls the number of rows, as some columns may represent "fake" drives. The number of rows in the matrix, multiplied by the data is chunk size, is the size of the smallest entity that is protected by RAID 6 parity. However, because the value of n is constrained by the RAID 6 scheme (to be a prime number in the case of the Knight's Tour, and one less than a prime number in the case of other schemes), it may not be easy to find an n that is commensurate with other natural boundaries in a storage subsystem, which tend to be expressed in powers of 2 —512 bytes in a sector, and usually some power-of-2 sectors in a stripe.

If RAID 6 parity domain boundaries do not line up with natural I/O boundaries, extra I/O's will have to be performed sometimes on RAID 6 write operations—something to be avoided.

Other prior art schemes are rescued by the fact that there are powers of 2 that are one less than a prime number—for instance, 4, 16, and 256. Increasing n to one of these values allows you to make the RAID 6 parity group size commensurate with disk chunk sizes, although 256 is a very unwieldy size for the RAID matrix. However, the Knight's Tour scheme is not so lucky, as n itself must be prime and so is never commensurate with a power of 2.

However, all is not lost—a combination of two Knight's Tour solutions can be commensurate with a power of 2. For instance, assume one wants to implement a Knight's Tour RAID 6 scheme for 6 data disks. Since 6 is not a prime number, it will have to be increased to at least 7. But 7, of course, is incommensurate with a power-of-2 size for a disk data chunk—in this example, let's say a 4096-byte "disk chunk" (8 512-byte sectors). So one should divide the disk chunk into two sub-diskchunks, one of 1664 bytes and one of 2432 bytes. Use a Knight's Tour with n=13 to protect the 1664-byte sub-diskchunk, by adding 7 "phantom" drives (which do not add anything to I/O or computation), and use a Knight's Tour with n=19 to protect the 2432-byte sub-diskchunk, by adding 13 phantoms. In each chunk the "data chunk" for RAID 6 XOR calculations is 128 bytes. This works because 13 and 19 are both primes and 13+19=32, which is a power of 2. Alternatively, one could divide the disk chunk into two sub-diskchunks, one of 1408 bytes and one of 2688 bytes; then use a Knight's Tour with n=11 and a data chunk of 128 bytes to protect the first sub-diskchunk, and a Knight's Tour with n=7 and a data chunk of 3·128=384 bytes to protect the second sub-diskchunk. This also works, because 7 and 11 are primes and 3·7+11=32, which is a power of 2.

However, there is a mathematical principle that every even number is the sum of two primes (Goldbach's Conjecture). Thus, the method can be generalized to allow an n×n matrix code, with n prime, to be commensurate with storage systems that in general expect data chunks equal in size to a power of 2.

Thus, in general, the storage array can be divided into a plurality, k, of sub-arrays $S_1, S_2, \ldots S_k$, each sub-array having the same number of physical storage devices n as the whole array, and each sub-array $S_i$ ($1 \leq i < k$) having a number $m_i$ of phantom storage devices such that $n+m_i$ is a prime number, and where N is the total size of all k sub-arrays, given as $$N = \sum_{1 \leq i < k} n + m_i.$$

While this invention has been particularly shown and described with references to example embodiments thereof, it will be understood by those skilled in the art that various changes in form and details may be made therein without departing from the scope of the invention encompassed by the appended claims.

APPENDIX

Solution Tables for Two Failed Data Disks

```
//B_{n,D,i} is the i^{th} bit (little-endian) of sol_tbl<n>[D]
unsigned long sol_tb103[1]={
    0x00000002};
unsigned long sol_tb105[2]={
    0x00000002,
    0x00000009};
unsigned long sol_tb107[3]={
    0x00000002,
    0x00000029,
    0x00000011};
unsigned long sol_tb111[5]={
    0x00000002,
    0x000002a9,
    0x0000024a,
    0x00000112,
    0x00000041};
unsigned long sol_tb113[6]={
    0x00000002,
    0x00000aa9,
    0x00000491,
    0x00000221,
    0x00000949,
    0x00000081};
unsigned long sol_tb117[8]={
    0x00000002,
    0x0000aaa9,
    0x0000924a,
    0x00002221,
    0x0000a52a,
    0x00001042,
    0x00004892,
    0x00000201};
unsigned long sol_tb119[9]={
    0x00000002,
    0x0002aaa9,
    0x00012491,
    0x00011112,
    0x00008422,
    0x00002081,
    0x00029529,
    0x00024a49,
    0x00000401};
unsigned long sol_tb123[11]={
    0x00000002,
    0x002aaaa9,
    0x0024924a,
    0x00111112,
    0x00252949,
    0x00041042,
    0x002a54aa,
    0x00010102,
    0x00084421,
    0x00124492,
    0x00001001};
unsigned long sol_tb129[14]={
    0x00000002,
    0x0aaaaaa9,
    0x0924924a,
    0x02222221,
    0x02108422,
    0x01041042,
    0x00408101,
    0x0949494a,
    0x0aa552aa,
    0x00100402,
    0x04488912,
    0x0a52a529,
    0x04922492,
    0x00008001};
unsigned long sol_tb131[15]={
    0x00000002,
    0x2aaaaaa9,
    0x12492491,
    0x11111112,
    0x04210841,
    0x02082081,
    0x12244892,
    0x01010102,
    0x08844222,
    0x00200801,
    0x2a9552a9,
    0x2952952a,
    0x2529294a,
    0x24929249,
    0x00010001};
```

What is claimed is:

1. An information handling system comprising:
a storage array comprising a plurality, n, of physical storage devices and at least two additional storage devices such that the total number of storage devices in the array is n+2, the storage array for storing data symbols, and for storing parity symbols used in reconstructing the data symbols wherein the storage array is divided into a plurality, k, of sub-arrays $S_1, S_2, \ldots S_k$, each sub-array having the same number of physical storage devices n as the whole array, and each sub-array $S_i$ ($1 \leq i < k$) having a number $m_i$ of phantom storage devices such that $n+m_i$ is a prime number, and where N is the total size of all k sub-arrays, given as $$N = \sum_{1 \leq i < k} n + m_i;$$

and
a data processor, for determining an erasure code protecting the data symbols in the storage array against erasure in any two of the storage devices, the erasure code determined from two vectors of parity symbols, the parity symbol vectors derived from one or more logical combinations of corresponding data symbols, such that no more than n+1 data symbols contribute to any parity symbol.

2. The information handling system of claim 1 wherein the logical combinations of the corresponding data symbols comprise only exclusive-or (XOR) operations.

3. The information handling system of claim 1 wherein at least some of the parity symbols are determined from data symbols located on a diagonal path through the symbol array, with at most one extra term belonging to a set of extra terms forming a "Knight's Tour" as given by:

$$d_{(i+1) \bmod n, (2i+2) \bmod n} \text{ for } 0 \leq i < n.$$

4. The information handling system of claim 3 wherein a first vector of parity symbols for the erasure code is determined from symbols in the data array as $$\sum_{j=0}^{n-1} d_{i,j} = p_i \text{ for } 0 \le i < n$$

and a second vector of parity symbols is determined by $$\left(\sum_{j=0}^{n-1} d_{j,(i+j) \bmod n}\right) + d_{(i+1) \bmod n, (2i+2) \bmod n} = q_i \text{ for } 0 \le i < n.$$

5. The information handling system of claim 1 wherein n is a prime number.

6. The information handling system of claim 1 wherein n is not a prime number, and further wherein m is another number such that n+m is a prime number, and m additional phantom storage devices are assumed to exist during the determination of the erasure code, such that the m phantom storage devices also assumed to never fail and to always contain a predetermined data symbol.

7. The information handling system of claim 1 wherein the total size N of all k sub-arrays is not a prime number.

8. The information handling system of claim 1 wherein the total size N of all k sub-arrays is a power of 2.

9. The information handling system of claim 1 wherein a first vector, the P vector, of parity symbols is determined, if device j survived, as $$P_i = p_i + \left(\sum_{disk\ j\ survived} d_{i,j}\right)$$

and a second vector, the Q vector, of parity symbols is determined, if device (i+j) mod n survived, as $$Q_i = q_i + \left(\sum_{disk (i+j) \bmod n\ survived} d_{i,(i+j) \bmod n}\right) + (d_{(i+1) \bmod n, (2i+2) \bmod n})$$

wherein $d_{i,j}$ is the data symbol at location i,j.

10. The information handling system of claim 1 wherein if two data storage devices, j and k, have failed, a matrix of constant bitmaps, $B_{n,D,i}$ (bits indexed by i) is used to derive a parity symbol based on the number of devices n and a difference D in column numbers (modulo n) corresponding to the two failed devices, j and k.

11. The information handling system of claim 10 wherein the difference D is a minimum of (k−j)mod n and (j−k)mod n.

12. A method for operating an information handling system comprising:
storing an array of data symbols in a storage array;
storing at least two vectors of parity symbols in the storage array the vectors of parity symbols used in reconstructing the array of data symbols,
the storage array comprising at least n+2 physical storage devices wherein the storage array is divided into a plurality, k, of sub-arrays $S_1, S_2, \ldots S_k$, each sub-array having the same number of physical storage devices n as the whole array, and each sub-array $S_i$ ($1 \le i < k$) having a number $m_i$ of phantom storage devices such that $n+m_i$ is a prime number, and where N is the total size of all k sub-arrays, given as $$N = \sum_{1 \le i < k} n + m_i;$$

at least one of the parity symbol vectors derived from one or more logical combinations of corresponding data symbols; and
determining an erasure code protecting the data symbols against erasure of up to two of the storage devices, the erasure code determined from the data symbols, such that no more than n+1 data symbols contribute to any one parity symbol, wherein n is not a prime number, and further wherein m is another number such that n+m is a prime number, and wherein m additional phantom storage devices are assumed to exist during said determining the erasure code, such that the m phantom storage devices are assumed to never fail and to always contain a predetermined data symbol.

13. The method of claim 12 wherein the logical combinations of the corresponding data symbols comprise only exclusive-or (XOR) operations.

14. The method of claim 12 wherein at least some of the parity symbols are determined from data symbols located on a diagonal path through the symbol array, with at most one extra term belonging to a set of extra terms forming a "Knight's Tour" as given by:
$d_{(i+1) \bmod n, (2i+2) \bmod n}$ for $0 \le i < n$.

15. The method of claim 14 wherein a first vector of parity symbols for the erasure code is determined from symbols in the data array as $$\sum_{j=0}^{n-1} d_{i,j} = p_i \text{ for } 0 \le i < n$$

and a second vector of parity symbols is determined by $$\left(\sum_{j=0}^{n-1} d_{j,(i+j) \bmod n}\right) + d_{(i+1) \bmod n, (2i+2) \bmod n} = q_i \text{ for } 0 \le i < n.$$

16. The method of claim 12 wherein n is a prime number.

17. The method of claim 12 wherein a first array, the P array, of parity symbols is determined, if device j survived, as $$P_i = p_i + \left(\sum_{disk\ j\ survived} d_{i,j}\right)$$

and a second array, the Q array, of parity symbols is determined, if device (i+j)mod n survived, as $$Q_i = q_i + \left(\sum_{disk (i+j) \bmod n\ survived} d_{i,(i+j) \bmod n}\right) + (d_{(i+1) \bmod n, (2i+2) \bmod n})$$

wherein $d_{i,j}$ is a given one of the data symbols in the data array at location i,j.

18. The method of claim 17 wherein if two data storage devices, j and k, have failed, a matrix of constant bitmaps, $B_{n,D,i}$ (bits indexed by i) is used to derive a correction based on the number of devices n and a difference D in column numbers (modulo n) corresponding to the two failed devices, j and k.

19. The method of claim 18 wherein the difference D is a minimum of (k−j)mod n and (j−k)mod n.

* * * * *